United States Patent
Bradley et al.

(10) Patent No.: US 10,738,814 B2
(45) Date of Patent: Aug. 11, 2020

(54) SEALING AND SHIMMING OF STRUCTURAL JOINTS

(71) Applicant: Airbus Operations Limited, Bristol (GB)

(72) Inventors: Jeremy Bradley, Bristol (GB); Guy Tothill, Bristol (GB)

(73) Assignee: Airbus Operations Limited, Bristol (GB)

( * ) Notice: Subject to any disclaimer, the term of this patent is extended or adjusted under 35 U.S.C. 154(b) by 155 days.

(21) Appl. No.: 16/018,914

(22) Filed: Jun. 26, 2018

(65) Prior Publication Data

US 2019/0003504 A1 Jan. 3, 2019

(30) Foreign Application Priority Data

Jun. 29, 2017 (GB) .................................. 1710441.5

(51) Int. Cl.
| | |
|---|---|
| F16B 11/00 | (2006.01) |
| B64F 5/10 | (2017.01) |
| B29L 31/30 | (2006.01) |
| B29C 65/54 | (2006.01) |
| B29C 65/48 | (2006.01) |
| F16B 19/00 | (2006.01) |
| F16B 5/02 | (2006.01) |

(Continued)

(52) U.S. Cl.
CPC .............. *F16B 11/006* (2013.01); *B64F 5/10* (2017.01); *B29C 65/483* (2013.01); *B29C 65/54* (2013.01); *B29L 2031/3076* (2013.01); *B29L 2031/3082* (2013.01); *B29L 2031/3085* (2013.01); *B64C 1/069* (2013.01); *B64C 1/12* (2013.01); *F16B 5/02* (2013.01); *F16B 5/0233* (2013.01); *F16B 19/008* (2013.01); *F16B 33/004* (2013.01)

(58) Field of Classification Search
CPC ........ B64F 5/10; F16B 11/006; F16B 5/0233; B64C 1/069; B64C 1/12; B29C 65/483; B29C 65/54; B29L 2031/3076; B29L 2031/3082; B29L 2031/3085
See application file for complete search history.

(56) References Cited

U.S. PATENT DOCUMENTS

| | | | |
|---|---|---|---|
| 2008/0308211 A1* | 12/2008 | Crumpler | ................ B23P 19/00 156/70 |
| 2012/0276362 A1* | 11/2012 | Denavit | ................ F16B 11/006 428/223 |

FOREIGN PATENT DOCUMENTS

EP    2 518 340    10/2012

OTHER PUBLICATIONS

Combined Search and Examination Report for GB1710441.5, dated Dec. 20, 2017, 5 pages.

* cited by examiner

*Primary Examiner* — Carson Gross
(74) *Attorney, Agent, or Firm* — Nixon & Vanderhye P.C.

(57) ABSTRACT

A method of producing a sealed structural joint between two components (23, 24) and such a sealed joint are provided. The method includes the steps of applying a layer of sealant (27) to the first component (23), applying liquid shim (28) to the second component (24), inserting an intermediate layer (29) between the sealant (27) and the liquid shim (28), the intermediate layer (29) having a series of raised structural features (31) to engage the first component (23). The features (31) are positioned to allow the sealant (27) to extend across the joint between the raised features (31) to form a continuous seal. The joint is then closed and cure of the liquid shim (28) and sealant (27) takes place to solidify the shim (28) to the desired thickness within the joint.

12 Claims, 4 Drawing Sheets

(51) Int. Cl.
    *F16B 33/00*     (2006.01)
    *B64C 1/06*     (2006.01)
    *B64C 1/12*     (2006.01)

SEALING AND SHIMMING OF STRUCTURAL JOINTS

RELATED APPLICATION

This application claims priority to United Kingdom Patent Application GB 1710441.5, filed Jun. 29, 2017, which is incorporated by reference in its entirety.

FIELD OF THE INVENTION

The present invention relates to the formation of sealed and shimmed structural joints between components and more particularly to the formation of such joints between aircraft structural components.

BACKGROUND

The use of liquid shim in structural joints is commonplace in the aircraft industry. Liquid shim compensates for small tolerance mismatches between components prior to fastening and avoids build stresses that can lead to delamination of composite materials, stress corrosion cracking of metallic parts and premature fatigue cracking.

Liquid shim is generally a two-part epoxy paste. It may be applied by injection into the joint or by a "butter and paste" application. The liquid shim cures in place in the joint and the composition is optimised for compression and fatigue properties.

Current processes require joints to be disassembled several times during manufacture for cleaning, de-burring and application of liquid sealant. An example process which would require the joint to be assembled three times would be as follows:—

Step 1—Assemble joint and measure the gap or use a decision gauge
Step 2—Disassemble the joint and clean the faying surfaces
Step 3—Mix the liquid shim
Step 4—Apply liquid shim and assemble the joint
Step 5—Allow the shim to cure
Step 6—Disassemble joint for cleaning, preparation and drilling
Step 7—Inspect the joint
Step 8—Re-work the shim as necessary
Step 9—Apply sealant and final fasten joint together.

SUMMARY OF THE INVENTION

According to a first aspect of the present invention there is provided a method of producing a sealed structural joint between two components, the method including the steps of determining that the joint requires a liquid shim, applying a layer of sealant to the faying surface of the first component, applying liquid shim to the faying surface of the second component, inserting an intermediate layer between the faying surface of the first component and the liquid shim, the intermediate layer being formed with a series of raised structural features thereacross whereby upon joint closure to engage the faying surface of at least the first component, said series of raised structural features being positioned to allow the sealant to extend across the joint between said raised features and form a continuous seal across the joint face, closing the joint to achieve a desired separation of the faying surfaces and allowing cure of at least the liquid shim to take place whereby to solidify the shim to the desired thickness within the joint.

Once the sealant and liquid shim have cured to form the sealed structural joint, the method of the invention thus allows a continuous load path through the joint from the first component through the series of raised structural features to the solidified shim and thence to the second component. At the same time, the continuous seal across the joint face forms a sealed joint.

The method of the invention allows a considerably shorter process than the prior art process. With the method of the invention, "one way assembly" is possible, with the possibility of assembling the joint only once rather than up to three times as currently required.

Further, according to the method of the invention, unintended mixing of the uncured sealant with the liquid shim is largely avoided by the presence of the intermediate layer therebetween.

The intermediate layer may be formed as a continuous layer whereby to prevent either sealant or liquid shim passing therethrough.

Alternatively, the intermediate layer may be formed as a permeable layer whereby to allow either sealant or liquid shim to pass therethrough. Such a design may allow improved bonding within the joint.

The intermediate layer may be formed as a mesh if desired. This design of intermediate layer may be particularly suitable in certain circumstances, for example, if the chemistry of the liquid shim and sealant are compatible and can co-cure together, air voids will be more easily avoided.

The intermediate layer may conveniently be formed as a corrugated layer. If the layer is corrugated in two directions, this will result in a series of isolated said raised structural features, thereby allowing the continuous seal across the joint.

The intermediate layer may be formed of a generally flat sheet with a said series of raised structural features formed on one or both sides of the sheet. Forming the raised structural features on both sides of the sheet will avoid incorrect fitting of the intermediate layer, with the raised structural features directed towards the second component rather than the first component.

The raised structural features may comprise dimples which may be generally circular and may be regularly or irregularly spaced from each other.

The dimensions of the raised structural features of the intermediate layer, measured across the joint, may be determined in dependence upon a cross sectional area of any fastener which is intended to pass through the joint. More specifically, the raised structural features must have a small enough surface area such that an even distribution of compressive stress occurs around the fastener, for example bolt, when fitted.

The method may include at least one of the steps of cleaning, de-burring and drilling the joint. Disassembly of the joint may be required for cleaning or de-burring.

The method may include the step of disassembling the joint for inspection and the step of applying a layer of sealant to the faying surface of the first component may therefore be carried out after the said disassembly step. In such case, separate curing of the sealant may be required, upon re-assembly.

BRIEF DESCRIPTION OF THE DRAWINGS

The present invention will now be described, by way of example only, with reference to the following drawings in which:—

DESCRIPTION OF PREFERRED EMBODIMENT

With reference to FIG. 1, a joint assembled according to the prior art is shown. This method of joint assembly is current in aircraft production and requires the joint to be disassembled at least twice before final assembly.

Figure 1A:
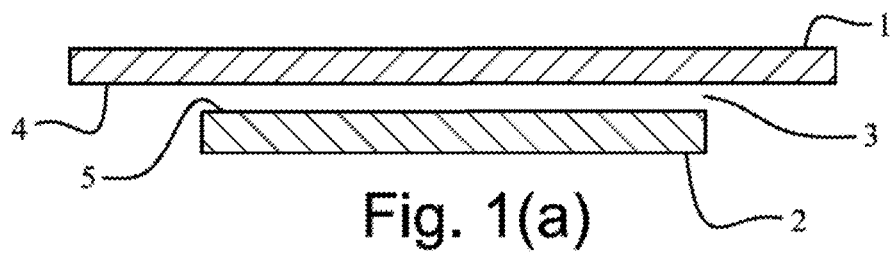
FIG. 1a is a sectional view of a joint pre-assembled, according to the prior art.

Looking at FIG. 1a, first and second components 1, 2 are assembled together and a gap 3 between faying surfaces 4, 5 of the components is measured or a decision gauge used.

Figure 1B:
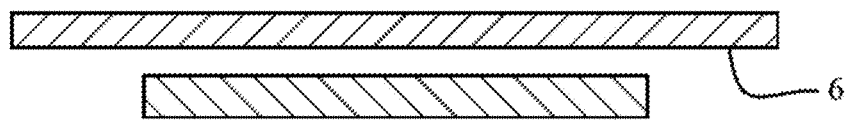
FIG. 1b shows the same joint with release film applied.

In FIG. 1b, the joint is disassembled for the first time and release film 6 is applied to the faying surface 4 of component 1, in order to prevent adhesion of liquid shim to the faying surface 4.

Figure 1C:
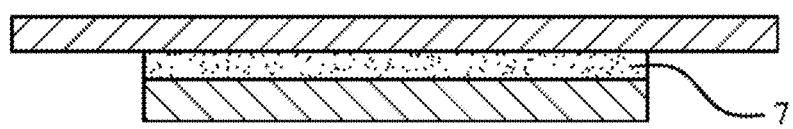
FIG. 1c shows the same joint with release film and liquid shim applied.

In FIG. 1c, liquid shim 7 is applied to faying surface 5 of component 2 by injection into the joint or by butter and paste application. Once the liquid shim has cured, the joint is disassembled to inspect for porosity in the shim 7; the shim is then repaired as necessary and the joint re-assembled.

Figure 1D:
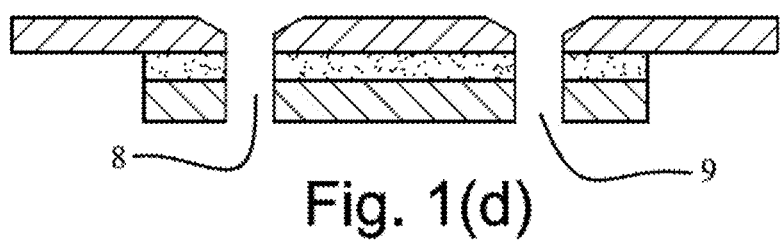
FIG. 1d shows the same joint drilled off.

In FIG. 1d, the assembly 1, 2, 6, 7 is drilled off to form apertures 9, 10 through the joint to receive fasteners. The joint is then disassembled for the second time for cleaning and de-burring and for the release film 6 to be removed. The joint is then inspected for porosity and other defects in the shim 7; the shim is then repaired as necessary.

Figure 1E:
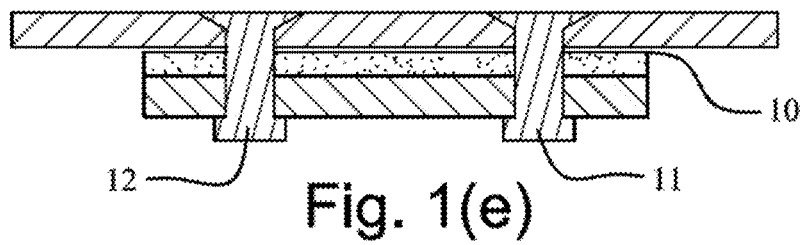
FIG. 1e shows the same joint finally assembled.

Finally, in FIG. 1e, final assembly of the joint takes place: interfay sealant 10 is applied and fasteners 11, 12 are installed.

The method of the invention is able to remove at least one if not both disassembly steps from the above process and thereby markedly to reduce overall process time and at the same time reduce the potential for process errors.

Figure 2A:
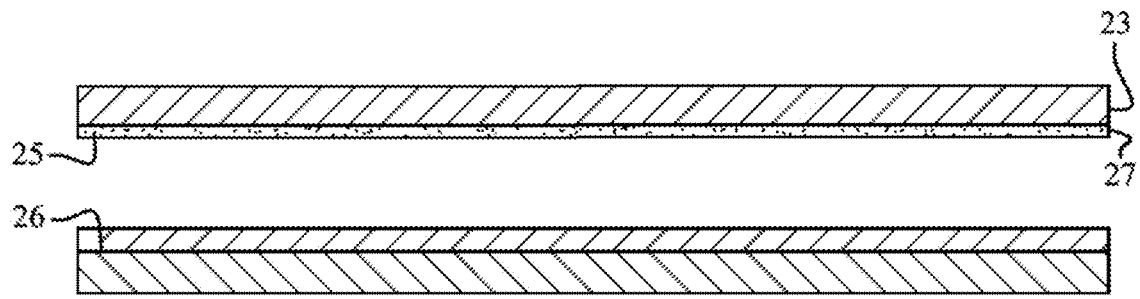
FIG. 2a is a sectional view of a joint with sealant and liquid shim applied, according to the invention.
Figure 2B:
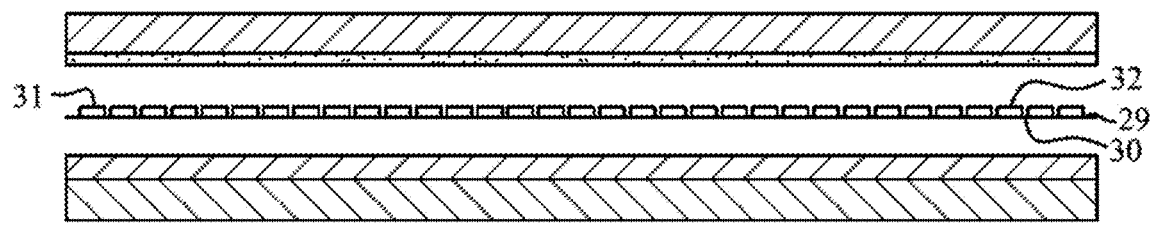
FIG. 2b shows the same joint with an intermediate layer inserted into the joint.
Figure 2C:
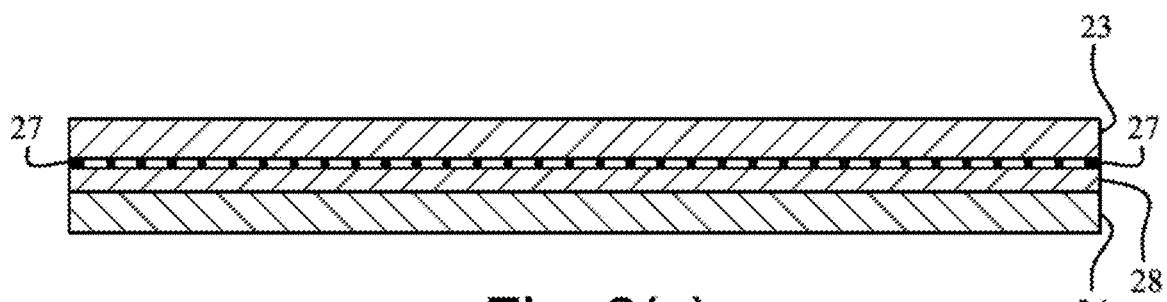
FIG. 2c shows the same joint closed.

Referring to FIGS. 2a to 2c, an example process according to the invention is described. FIG. 2a shows components 23, 24 having faying surfaces 25, 26. Initially, the structural designer has here decided that the structure interfaces will require shimming and set the design dimensions for the joint accordingly. No measurement of the joint gap between faying surfaces 25, 26 will therefore be necessary. Next, appropriate cleaning and pre-treatment of the faying surfaces 25, 26 is carried out. Onto faying surface 25 is applied a standard sealant 27 and onto faying surface 26 is applied two-part epoxy liquid shim 28.

Figure 3:
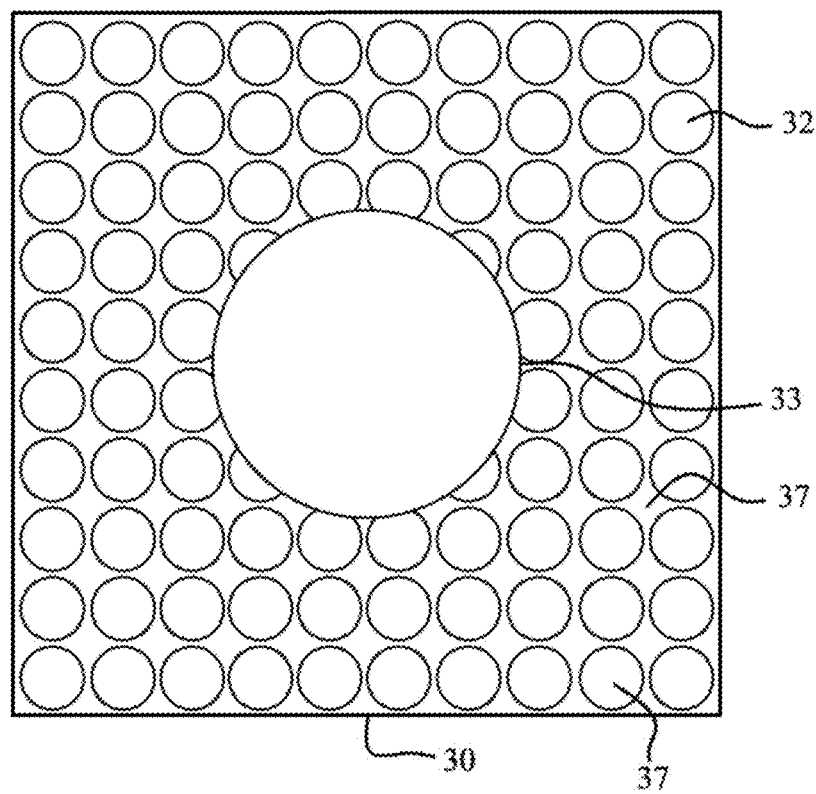
FIG. 3 shows a first intermediate layer according to the invention.

Next, with reference to FIG. 2b and FIG. 3, an intermediate layer 29 is inserted between components 23, 24 as shown. The intermediate layer 29 comprises a flat sheet 30 having a regular series of raised structural features in the form of raised dimples 31 distributed across the sheet. The raised dimples 31 each have a flat top 32 and a height not exceeding 200 μm.

It will be observed from FIG. 3 that a continuous matrix of sealant 37 applied to the intermediate layer 29 between the dimples 31 will extend both horizontally and vertically of the layer 29. A sealed joint may therefore be created such that no leak path can form across the joint face between the intermediate layer 29 and the faying surface 25, using the method of the invention.

The dimples 31 must be sized so that each flat top, which will be in contact with the faying surface 25 of the first component 23, will have a small enough surface area so that, once an aperture 33 is drilled through the component assembly 23, 24 for fastener insertion through the joint, an even distribution of compression load from the first component 23 through the intermediate layer 29 to the second component 24 is possible around the entire fastener aperture 33. If the surface area of the dimples 31 is too large, there is a greater risk that the loading is not evenly transferred.

FIG. 2c shows the joint assembled for curing of the liquid shim 28 and sealant 27 to take place in situ. No further disassembly of the joint is necessary.

Figure 4:
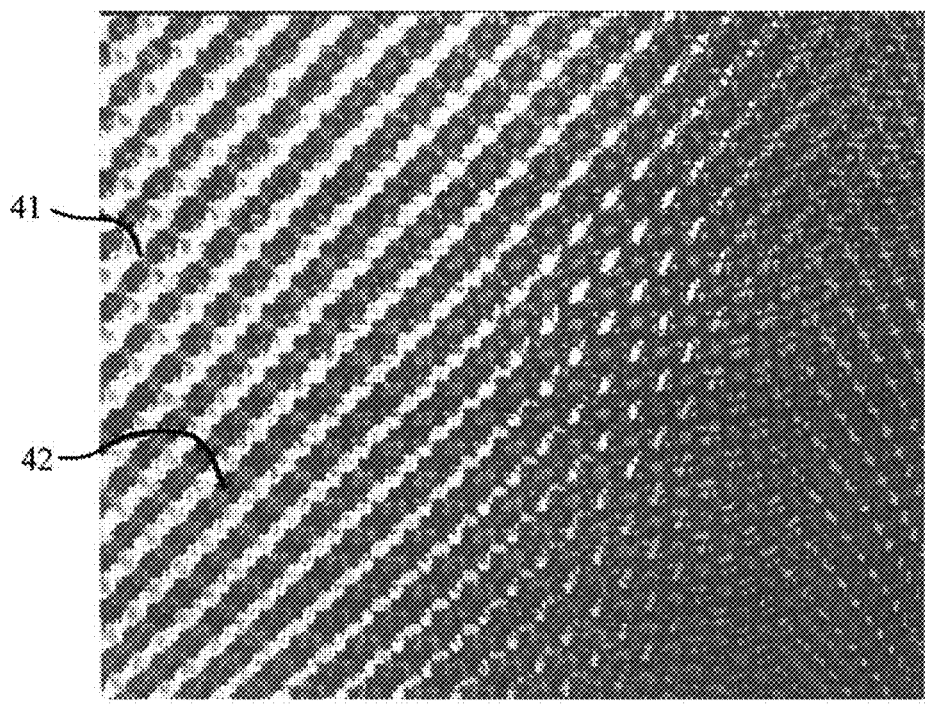
FIG. 4 shows a second corrugated intermediate layer according to the invention

FIG. 4 shows a corrugated intermediate layer 41. The layer is corrugated in two directions with peaks 42 of the double corrugation forming the raised structural features.

Figure 5:
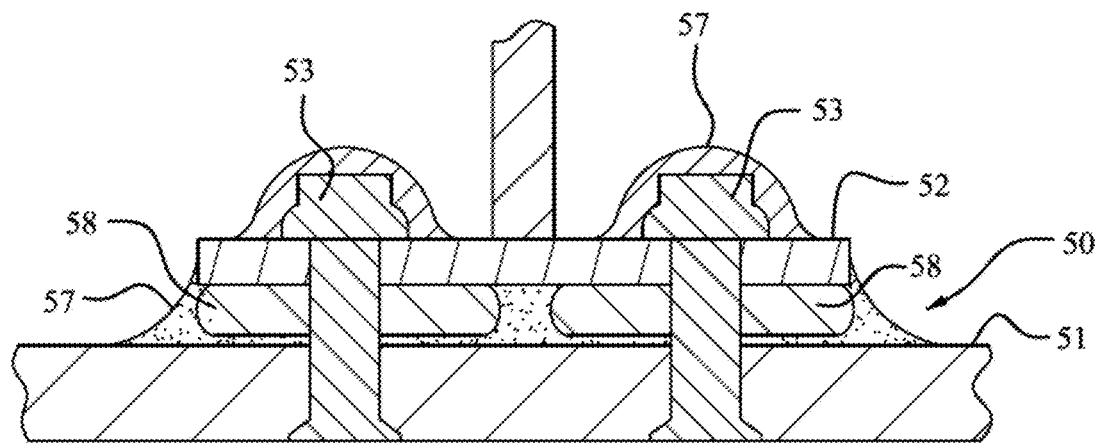
FIG. 5 is a side part sectional view of a sealed structural joint according to the invention.

FIG. 5 shows a sealed structural joint 50, according to the invention with various features exaggerated, for clarity. The joint 50 is formed between a first component in the form of a wing skin 51 and a second component in the form of a rib foot 52. The joint is sealed with sealant 57 and is packed with cured liquid shim 58. The joint is secured with fasteners 53.

A joint formed as in FIG. 5, according to the invention, is ideally suited for the connection of rib feet to a wing skin. Such a joint must be dimensionally extremely precise as the relatively flexible wing skin is being drawn into contact with a structurally stiff rib. Any dimensional error attributable to component misalignment in the joint will distort the wing skin from its design profile and upset the aerodynamics of the aircraft. Additionally, the joint must normally be sealed as the wing box is in almost all cases a fuel tank and fuel leakage past the joint to the wing exterior must be prevented. Lightning strike is another risk to be avoided through adequate sealing. Such sealed structural joints on aircraft also occur in the fuselage.

The embodiments described herein are respective non-limiting examples of how the present technology, and aspects of the present technology, may be implemented. Any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined by the accompanying claims.

The word "or" as used herein is to be taken to mean "and/or" unless explicitly stated otherwise.

The invention claimed is:

1. A method of producing a sealed structural joint between first and second components, the method includes:
   determining that the sealed structural joint requires a liquid shim, wherein the sealed structural joint is between the first and second components,
   applying a layer of sealant to a faying surface of the first component, applying the liquid shim to a faying surface of the second component, inserting an intermediate layer between the faying surface of the first component and the liquid shim, wherein the intermediate layer is formed with a series of raised structural features thereacross whereby upon joint closure to engage the faying surface of at least the first component, wherein the series of raised structural features are positioned to allow sealant from the layer of sealant to extend across the joint between said raised features and form a continuous seal across the joint, closing the joint to achieve a desired separation of the faying surfaces, and curing at least the liquid shim to solidify the shim to a desired thickness within the joint.

2. The method according to claim 1, in which the intermediate layer is formed as a continuous layer to prevent either the sealant or the liquid shim passing therethrough.

3. The method according to claim 1, in which the intermediate layer is formed as a permeable layer to allow at least one of the sealant and the liquid shim to pass therethrough.

4. The method according to claim 1, in which the intermediate layer is formed as a mesh.

5. The method according to claim 1, in which the intermediate layer is formed as a corrugated layer.

6. The method according to claim 1, in which the intermediate layer is formed of a flat sheet with said series of raised structural features formed on either side of the flat sheet.

7. The method according to claim 1, in which dimensions of the raised structural features of the intermediate layer, measured across the joint, are determined in dependence upon a cross sectional area of a fastener intended to pass through the joint.

8. The method according to claim 1, including cleaning or drilling the joint.

9. The method according to claim 1, including disassembling the joint for inspection and wherein the step of applying a layer of sealant to the faying surface of the first component is carried out after the disassembly of the joint for inspection.

10. A method to join first and second components including:

determining a desired thickness for a shim to be inserted between the first and second components;

applying a layer of sealant to a first faying surface of the first component, applying liquid shim to a second faying surface of the second component, inserting an intermediate layer between the layer of sealant and the liquid, wherein a first surface of the intermediate layer includes projections facing the layer of sealant;

closing a gap between the first and second components while the layer of sealant, the liquid shim and the intermediate layer are between the first and second components;

squeezing the layer of sealant between the intermediate layer and the first faying surface by closing the gap, wherein the squeezing distributes sealant in the layer of sealant between the projections of the first surface of the intermediate layer, across the first faying surface and thereby forms a seal between the intermediate layer and the first component; and curing the liquid shim to solidify the shim to the desired thickness after closing the gap and squeezing the layer of sealant.

11. The method of claim 10 further comprising preventing mixing of the layer of sealant and the liquid shim by the insertion of the intermediate layer.

12. The method of claim 10 wherein the projections on the first surface of the intermediate layer are dimples with flat tops distributed across an entire area of the first surface which faces the first component, and the method further comprises abutting the flat tops of the dimples against the first flaying surface as a result of the closure of the gap.

* * * * *